United States Patent
Blum

(10) Patent No.: US 12,533,304 B2
(45) Date of Patent: Jan. 27, 2026

(54) WATERPROOF MINERAL SUNSCREEN COMPOSITIONS

(71) Applicant: Stream2Sea LLC, Wauchula, FL (US)

(72) Inventor: Autumn Blum, Wauchula, FL (US)

(73) Assignee: Stream2Sea LLC, Wauchula, FL (US)

( * ) Notice: Subject to any disclaimer, the term of this patent is extended or adjusted under 35 U.S.C. 154(b) by 475 days.

(21) Appl. No.: 18/134,830

(22) Filed: Apr. 14, 2023

(65) Prior Publication Data

US 2023/0329985 A1     Oct. 19, 2023

Related U.S. Application Data

(60) Provisional application No. 63/331,403, filed on Apr. 15, 2022.

(51) Int. Cl.
| | |
|---|---|
| *A61K 8/27* | (2006.01) |
| *A61K 8/34* | (2006.01) |
| *A61K 8/85* | (2006.01) |
| *A61K 8/9794* | (2017.01) |
| *A61Q 17/04* | (2006.01) |

(52) U.S. Cl.
CPC ................ *A61K 8/27* (2013.01); *A61K 8/345* (2013.01); *A61K 8/85* (2013.01); *A61K 8/9794* (2017.08); *A61Q 17/04* (2013.01)

(58) Field of Classification Search
None
See application file for complete search history.

(56) References Cited

U.S. PATENT DOCUMENTS

| | | |
|---|---|---|
| 2006/0008426 A1 | 1/2006 | Doring et al. |
| 2010/0111884 A1 | 5/2010 | Acker et al. |
| 2012/0121721 A1 | 5/2012 | James |
| 2013/0309321 A1 | 11/2013 | Kolditz et al. |
| 2019/0224085 A1 | 7/2019 | Ionidis |
| 2020/0188248 A1 | 6/2020 | Rigg et al. |
| 2021/0196604 A1 | 7/2021 | Rowney et al. |

OTHER PUBLICATIONS

International Preliminary Report on Patentability dated Oct. 24, 2024 issued in PCT/US23/018632.
International Search Report and Written Opinion dated Jul. 10, 2023 issued in PCT/US23/18632.

*Primary Examiner* — Nannette Holloman
(74) *Attorney, Agent, or Firm* — HUNTON ANDREWS KURTH LLP

(57) ABSTRACT

The present application pertains to a sunscreen comprising an emulsion such as a water in oil emulsion. The emulsion comprises: an oil phase comprising from about 15 to about 25% zinc oxide, polyhydroxystearic acid, and a mixture comprising one or more esters; and an aqueous phase comprising water, a salt, glycerol, an aloe compound, and *Curcuma longa* root. Advantageously, the sunscreens described here may surprisingly and unexpectedly exhibit an increase in sun protection factor after being immersed in water. The sunscreens are also environmentally-friendly, lightweight, non-comedogenic, and non-greasy.

19 Claims, 2 Drawing Sheets

WATERPROOF MINERAL SUNSCREEN COMPOSITIONS

CROSS-REFERENCE TO RELATED APPLICATIONS

The present application claims priority to U.S. Provisional Application No. 63/331,403 filed Apr. 15, 2022 which application is incorporated by reference herein.

FIELD OF THE APPLICATION

The present application pertains to waterproof mineral sunscreen compositions that are environmentally-friendly, lightweight, silicone-free, non-comedogenic, and non-greasy.

BACKGROUND AND SUMMARY

Protection of the skin from ultraviolet rays is one of the major issues in skin care and body care, and various sunscreens have been developed to minimize adverse effects of ultraviolet rays on the skin. Unfortunately, when a sunscreen applied on the skin contacts water or sweat, the active ingredients tend wash off and UV protection ability is degraded. It would be desirable if a sunscreen could be developed that offered adequate or even increased protection when exposed to water. It would further be advantageous if such a sunscreen were environmentally-friendly, lightweight, non-comedogenic, silicone-free, and/or non-greasy.

Advantageously, the sunscreens described in the instant application are environmentally-friendly, lightweight, non-comedogenic, silicone-free, and/or non-greasy. Further, the sunscreens described herein offer more than adequate and in some cases even increased sun protection when exposed to water.

In one embodiment the present application pertains to a sunscreen comprising an emulsion. The emulsion comprises: an oil phase comprising from about 15 to about 25% zinc oxide, polyhydroxystearic acid, and a mixture comprising one or more esters; and an aqueous phase comprising water, a salt, glycerol, an aloe compound, and *Curcuma longa* root. Advantageously, the sunscreens described here may surprisingly and unexpectedly exhibit an increase in sun protection factor and broad spectrum protection after being immersed in water.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
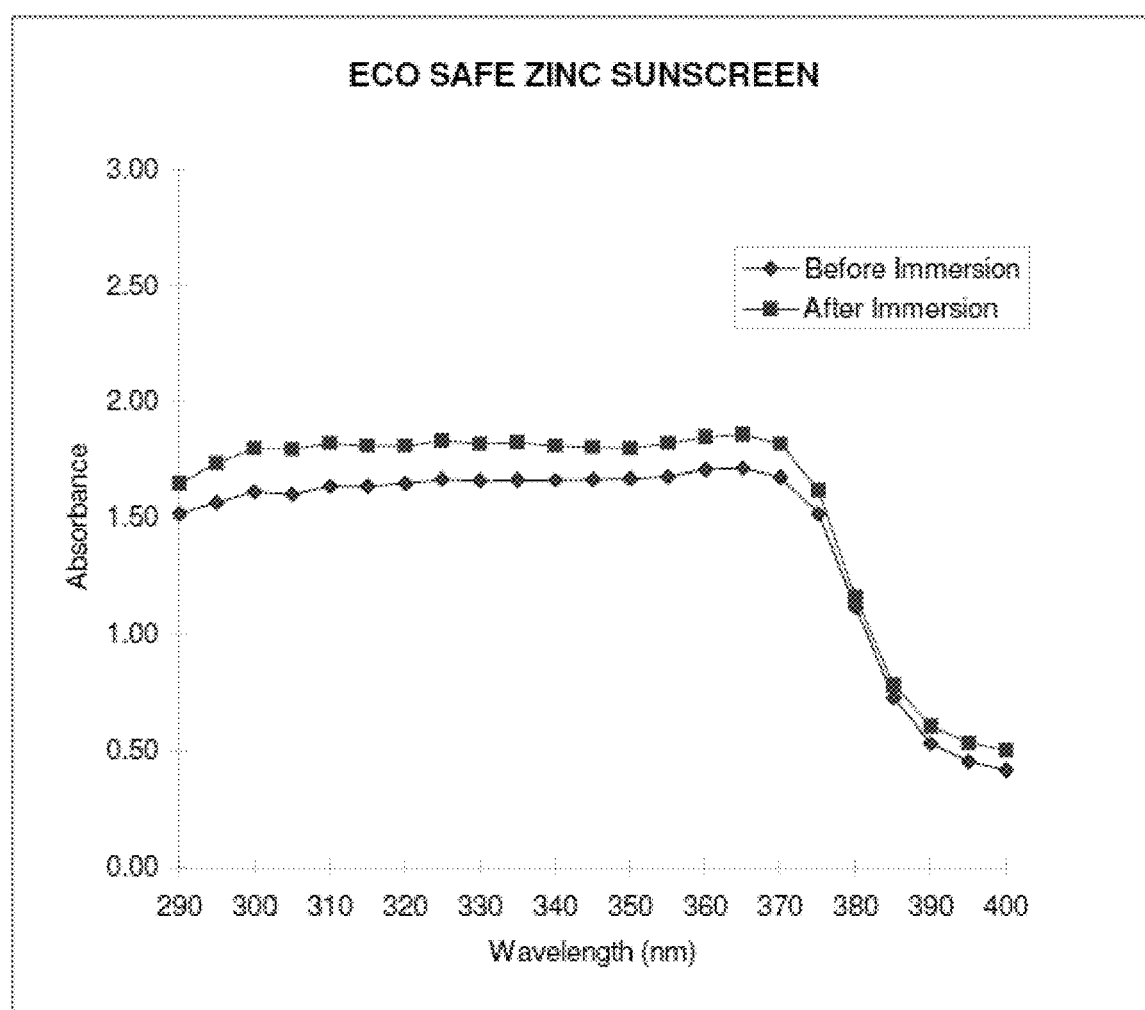
FIG. 1 shows in-vitro water resistance SPF results.
Figure 2:
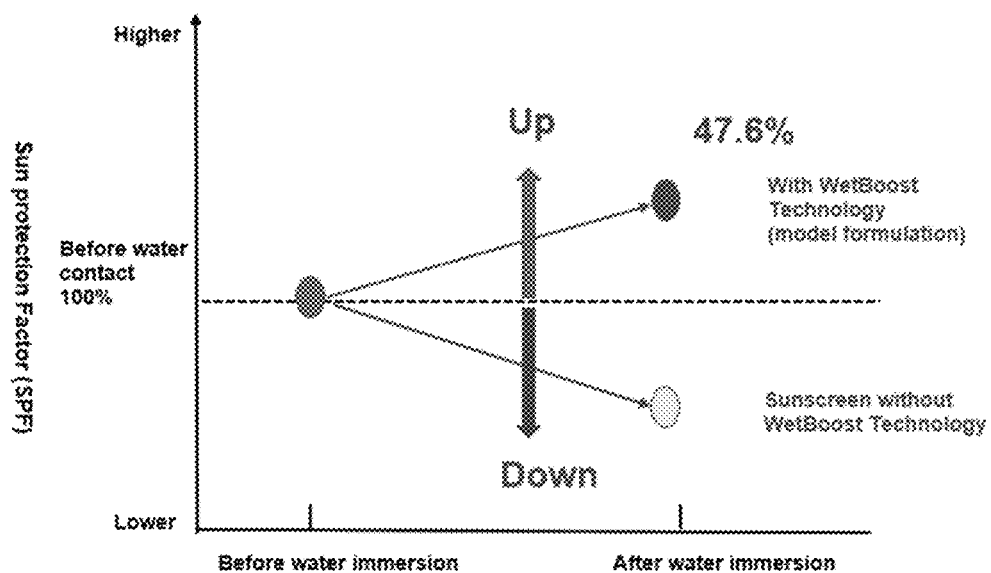
FIG. 2 shows increase in Sun Protection Factor (SPF) after 80 minutes water immersion.

Exemplary embodiments of the invention will now be described in order to illustrate various features of the invention. The embodiments described herein are not intended to be limiting as to the scope of the invention, but rather are intended to provide examples of the components, use, and operation of the invention.

The sunscreens of the present application generally pertain to an emulsion comprising an aqueous phase and an oil phase. While the components are generally described herein with reference to whether they are in an oil phase or an aqueous phase it should be recognized that the presence or absence of other components could cause a component to be considered as part of the other phase. That is, whether a component is described as being in an aqueous phase or an oil phase is not particularly relevant so long a composition contains said component.

Oil Phase

The emulsions herein generally may have an oil phase comprising from about 15 to about 25% zinc oxide, polyhydroxystearic acid, and a mixture comprising one or more esters. The ingredients in the oil phase may generally be mixed in any convenient order which order may vary depending upon the specific ingredients, amounts, and mixing method.

The zinc oxide active ingredient herein may be present in amounts which may vary depending upon the level of SPF protection desired, other ingredients, and other desired characteristics of the sunscreen. Typically, zinc oxide active ingredient may be present in at least about 15, or at least about 17, or at least about 18 up to about 25, or up to about 23, or up to about 21 weight percent based on the total weight of the sunscreen composition. In some embodiments the zinc oxide active ingredient is present at from about 18.5 to about 19.5 weight percent.

The polyhydroxystearic acid (or another plant based dispersant) is generally employed in an emulsifying amount. Such amounts may vary depending upon the other ingredients but often may be from about 0.5, or from about 1, or from about 2, up to about 5, or up to about 7 weight percent based on the total weight of the sunscreen composition.

The mixture comprising one or more esters is not particularly limited. In some embodiments the mixture comprising one or more esters comprises coco-caprylate/caprate, isoamyl laurate, or any mixture thereof. Additionally or alternatively, in some embodiments the mixture comprising one or more esters may comprise a jojaba ester, a polyglyceryl ester such as polyglyceryl-3-oleate, or any mixture thereof. As with the other ingredients the amount of esters in the formulation varies depending upon the desired characteristics and other ingredients. In some cases the amounts may be from about 10, or from about 14, or from about 19 up to about 25 or up to about 20 weight percent based on the total weight of the sunscreen composition.

The oil phase comprises optional additional components such as, for example, from about 0.1 to about 1% or up to about 3% weight percent based on total weight of a hydrogenated triterpene like squalane oil. The oil phase may also optionally comprise mica, silica, or a mixture thereof in amounts of from about 1 to about 3 weight percent based on the total weight of the sunscreen composition.

Aqueous Phase

An aqueous phase of the emulsion generally comprises water such as distilled water, a salt, glycerol, and optionally an aloe compound, and/or *Curcuma longa* (turmeric) root. The amount of water may vary but in some embodiments is more than 30, or more than 35 or more than 40 up to about 60, or up to about 50, or up to about 45 weight percent based on total weight of the sunscreen composition.

The salt is not particularly limited and may comprise, for example, NaCl in an amount of at least about 0.5, or at least about 1 up to about 5, or up to about 2, or up to about 1.5 weight percent based on total weight of the sunscreen composition.

The aloe compound, if present, may be selected from any available compound and in some embodiments may comprise Aloe Barbadensis Leaf Juice in a reconstituted amount of from about 0.05 up to about 0.2, or from about 0.2 up to about 30 weight percent based on total weight of the sunscreen composition.

The aqueous phase may further comprise other ingredients such as a glycol like propylene glycol, a sugar alcohol, a preservative and/or chelating agent like ethyl lauroyl arginate hydrochloride, tetrasodium glutamate diacetate, potassium sorbate, sodium stearoyl glutamate and any mixtures thereof Other Ingredients The sunscreen may optionally comprise other ingredients such as mixed tocopherols, film formers such as diisostearoyl polyglyceryl-3 dimer dilinoleate, Caprylic/Capric Triglyceride, and any mixture thereof.

Method of Preparing

The method of preparing the emulsions herein and the order of addition of ingredient are not particularly critical. In some embodiments it may be preferable to make an aqueous phase and oil phase separately and then mix them together. Alternatively, one may mix all the desired ingredients together.

Water Resistance

The sunscreens described herein may exhibit an increase in sun protection factor after being immersed in water. That is, a 2 mg/cm$^2$ application of the sunscreen to a human skin may result in the sunscreen exhibiting an increase in sun protection factor after 80 minutes of the skin being immersed in water. Such increases vary depending upon the specific formulation but may be an increase in SPF number of at least about 2, or at least about 4, or at least about 5, or at least about 6, or at least about 7, or at least about 8.

EXAMPLES

Four sunscreens were formulated wherein each comprised 19% zinc oxide (non nano) as the active ingredient and offered a Sun Protection Factor (SPF) of 45 for UVA and UVB. Each sunscreen was fragrance-free, sheer, and non-greasy. Each sunscreen was found to be rated for 80 minutes as water-resistant. Each sunscreen comprises an antioxidant blend to protect, nourish, and restore even sensitive skin. The sunscreens are described below.

Example One—Every Day Mineral Sunscreen

This example comprised the following inactive ingredients in order of amount.

Deionized Water, Aloe Barbadensis Leaf Juice*, Coco-Caprylate/-Caprate, Isoamyl Laurate, Vegetarian Glycerin, Polyglyceryl-3 Oleate, Propanediol, Polyhydroxystearic Acid, Diisostearoyl Polyglyceryl-3 Dimer Dilinoleate, Mica, Caprylic/Capric Triglyceride, Sodium Chloride, Ethyl lauroyl arginate HCl, Jojoba Esters, Olive Squalane Oil, Extracts of *Alaria esculenta* (Wakame Seaweed), *Olea europa* (Olive) Leaf*, *Camellia sinenis* (Green Tea) Leaf*, *Ocimum tinuiflorum* (Tulsi) Leaf*, *Cocos nucifera* (Coconut) Oil, *Curcuma longa* (Turmeric) Root* Extract, Tetrasodium Glutamate Diacetate, Mixed Tocopherols, Sodium Stearoyl Glutamate, Silica, Xanthan Gum. *ORGANIC INGREDIENTS Example Two—Every Day Mineral Sunscreen—Neutral Tint Blends This example comprised the following inactive ingredients in order of amount.

Deionized Water, Aloe Barbadensis Leaf Juice*, Coco-Caprylate/Caprate, Isoamyl Laurate, Vegetarian Glycerin, Polyglyceryl-3 Oleate, Propanediol, Polyhydroxystearic Acid, Diisostearoyl Polyglyceryl-3 Dimer Dilinoleate, Mica, Caprylic/Capric Triglyceride, Sodium Chloride, Ethyl lauroyl arginate HCl, Jojoba Esters, Olive Squalane Oil, Extracts of *Alaria Esculenta* (Wakame Seaweed), *Olea europa* (Olive) Leaf*, *Camellia sinenis* (Green Tea) Leaf*, *Ocimum tinuiflorum* (Tulsi) Leaf*, *Cocos nucifera* (Coconut) Oil, *Curcuma longa* (Turmeric) Root* Extract, Tetrasodium Glutamate Diacetate, Mixed Tocopherols, Sodium Stearoyl Glutamate, Silica, Xanthan Gum, Iron Oxides (C.I. 77492, C.I. 77491, C.I. 77499). *ORGANIC INGREDIENTS Example Three—Every Day Mineral Sunscreen—Soothing Chamomile & Calendula Extracts Kids This example comprised the following inactive ingredients in order of amount.

Deionized Water, Aloe Barbadensis Leaf Juice*, Coco-Caprylate/-Caprate, Isoamyl Laurate, Vegetarian Glycerin, Polyglyceryl-3 Oleate, Propanediol, Polyhydroxystearic Acid, Diisostearoyl Polyglyceryl-3 Dimer Dilinoleate, Mica, Caprylic/Capric Triglyceride, Sodium Chloride, Ethyl lauroyl arginate HCl, Jojoba Esters, Olive Squalane Oil, Extracts of *Chamomilla recutita* (Chamomile) Flower (and) *Calendula officinalis* (and) *Camellia sinensis* (Green Tea) Leaf (and) *Ocimum tinuiflorum* (Tulsi) in *Cocos nucifera* (Coconut) Oil, *Curcuma longa* (Turmeric) Root* Extract, Tetrasodium Glutamate Diacetate, Mixed Tocopherols, Sodium Stearoyl Glutamate, Silica, Xanthan Gum. *ORGANIC INGREDIENTS Example Four—Every Day Mineral Sunscreen—Shimmer for Sparkle Effect This example comprised the following inactive ingredients in order of amount.

Deionized Water, Aloe Barbadensis Leaf Juice*, Coco-Caprylate/-Caprate, Isoamyl Laurate, Vegetarian Glycerin, Polyglyceryl-3 Oleate, Propanediol, Polyhydroxystearic Acid, Diisostearoyl Polyglyceryl-3 Dimer Dilinoleate, Mica, Caprylic/Capric Triglyceride, Sodium Chloride, Ethyl lauroyl arginate HCl, Jojoba Esters, Olive Squalane Oil, Extracts of *Alaria esculenta* (Wakame Seaweed), *Olea europa* (Olive) Leaf*, *Camellia sinenis* (Green Tea) Leaf*, *Ocimum tinuiflorum* (Tulsi) Leaf*, *Cocos nucifera* (Coconut) Oil, *Curcuma longa* (Turmeric) Root* Extract, Tetrasodium Glutamate Diacetate, Mixed Tocopherols, Sodium Stearoyl Glutamate, Silica, Xanthan Gum, Calcium Titanium Borosilicate (and) Titanium Dioxide. *ORGANIC INGREDIENTS In Vitro Test of Critical Wavelength A sample similar to examples 1~4 was measured to determine the critical wavelength for a sunscreen formula, in vitro, in accordance with the "Broad Spectrum Test" of 21

FDA CFR Parts 201 and 310, Labeling and Effectiveness Testing; Sunscreen Drug Products for Over-the-Counter Human Use. Final Rule. Federal Register, Vol. 76, No. 117, Jun. 17, 2011, and per Florida Suncare Testing, Inc. SOP 2011-06. The test was performed utilizing an Optometries LLC, Model and a SPF-290S UV spectrometer Analyzer System, equipped with the WinSPF Software version 4.5. The critical wavelength was determined of the absorbance curve obtained by measuring the UV transmittance of the test formula.

The sample was prepared on three individual PMMA plates and scanned five times at different locations on each plate for a total of 15 measurements. The mean (critical wavelength) of the sample was determined to be 377.62 nm with a UVA I/UV Ratio of 0.88 using the UV Spectrometry Protocol below. This supports a broad spectrum claim.

UV Spectrometry Protocol

1. Plate. The plates to be used are constructed of optical grade polymethylmethacrylate (PMMA) suitable for UV transmittance measurements. The plates are roughened on one side to a three dimensional surface topography measure (Sa) between 2 and 7 micrometers. They are square with all sides being 5 cm.

2. Sample Holder. The SPF-290S used in this test is equipped with a horizontal x-y stage that holds the PMMA plate in a horizontal position. It is mounted as close as possible to the input optics of the spectrometer to maximize capture of forward scattered irradiation. It has a suitable aperture through which UV radiation can pass. The PMMA plate will be place on the upper surface of the sample holder with the roughened side up.

3. Light source. The SPF-290S has a xenon light source that produces a continuous spectral distribution of UV radiation from 290 to 400 nanometers.

4. Input optics. The SPF-290S is equipped with an integrating sphere.

5. Dynamic range of the spectrometer. The dynamic range of the SPF-290S is sufficient to measure transmittance accurately at all terrestrial solar UV wavelengths (290 to 400 nm).

B. Test Formula Application to PMMA Plate

The test formula will be applied to the PMMA plate on the roughened side at 0.75 mg per square centimeter. The test formula will be applied in a series of small dots over the entire plate and then spread evenly with a gloved finger (finger cot). Spreading will be done with a very light spreading action for approximately 30 seconds followed by spreading with greater pressure for approximately 30 seconds. The plate will then be allowed to equilibrate for 15 minutes in the dark before irradiation.

C. Test Formula Irradiation

The PMMA plates with the test formula will be irradiated with the Oriel as specified in section 352.70(b) of FDA, 21 CFR Part 352, Sunscreen Drug Products for Over-the-Counter Human Use: Proposed Amendment of Final Monograph, Federal Register, Vol. 72. No. 165, Aug. 27, 2007. The irradiation dose will be equivalent to an erythemal effective dose of 800 J/m2 (i.e., 800 J/m2 eff).

D. Calculation of Mean Transmittance Values

After the irradiation, mean transmittance values will be determined for each wavelength over the UV spectrum (290 to 400 nanometers) using the SPF-290S. The transmittance values will be measured at 1 nanometer intervals. 5 measurements of spectral irradiance transmitted for each wavelength through a PMMA plate coated with 15 microliters of glycerin will be taken and stored in the computer's memory along with the mean of the 5 measurements using the SPF-290S, this is called the reference reading. Then this procedure is repeated for 5 measurements with the PMMA plate coated with the test product, again the mean is computed and stored. The computer can then ratio the mean reference reading at each wavelength with the mean test formula reading to compute the mean test formula transmittance.

E. Calculation of Mean Absorbance Value

Mean transmittance values, are converted into mean absorbance values, at each wavelength by taking the negative logarithm of the mean transmittance value. The WinSPF's software makes this conversion.

F. Number of Plates 3 individual PMMA plates will be utilized for this test. Each plate will be scanned 5 times at different locations, resulting in a total of 15 measurements.

G. Calculation of the Critical Wavelength

The critical wavelength is identified as the wavelength at which the integral of the spectral absorbance curve reaches 90 percent of the integral over the UV spectrum from 290 to 400 nm. A mean critical wavelength of 370 nm or greater is classified as broad spectrum protection.

In Vitro Test of Water Resistance

A sample similar to examples 1-4 above was measured to determine in-vitro water resistance using a standard test. The sample was applied to a VITRO-SKIN® substrate at a rate of 2 mg/cm$^2$ and tested with 80 minutes of water immersion using a Labsphere UV-1000 Ultraviolet Transmittance Analyzer. The SPF was found to be 37.8±4.6 prior to immersion and surprisingly and unexpectedly found to be 55.8±8.0 after immersion. The data are shown in FIG. 1.

Advantageously, the present silicon-free sunscreen formulations have been found to have good SPF and excellent water immersion properties without incorporating (1) UV absorbing agents such as avobenzone, homolsalate, octisalate, and octocrylene or (2) organic modified clay mineral or aluminum silicates or (3) quaternary ammonium compounds.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A sunscreen comprising an emulsion wherein the emulsion comprises:
   an oil phase comprising from about 15 to about 25% zinc oxide, polyhydroxystearic acid, and a mixture comprising one or more esters; an aqueous phase comprising water, a salt, glycerol, an aloe compound, and *Curcuma longa* root; wherein a 2 mg/cm$^2$ application of the sunscreen to a human skin results in the sunscreen exhibiting an increase in sun protection factor after 80 minutes of the skin being immersed in water.

2. The sunscreen of claim 1 wherein the salt comprises NaCl.

3. The sunscreen of claim 1 wherein the mixture comprising one or more esters comprises coco-caprylate/caprate and isoamyl laurate.

4. The sunscreen of claim 1 wherein the aloe compound comprises Aloe Barbadensis Leaf Juice.

5. The sunscreen of claim 1 wherein the mixture comprising one or more esters comprises a jojaba ester.

6. The sunscreen of claim 1 wherein the mixture comprising one or more esters comprises a polyglyeryl ester.

7. The sunscreen of claim 6 wherein the polyglyeryl ester comprises polyglyeryl-3-oleate.

8. The sunscreen of claim 1 wherein the oil phase further comprises a hydrogenated triterpene.

9. The sunscreen of claim 8 wherein hydrogenated triterpene comprises squalane oil.

10. The sunscreen of claim 1 wherein the oil phase further comprises mica, silica, or a mixture thereof.

11. The sunscreen of claim 1 wherein the aqueous phase further comprises a sugar alcohol.

12. The sunscreen of claim 1 wherein the aqueous phase further comprises ethyl lauroyl arginate hydrochloride.

13. The sunscreen of claim 1 wherein the aqueous phase further comprises tetrasodium glutamate diacetate.

14. The sunscreen of claim 1 wherein the aqueous phase further comprises potassium sorbate.

15. The sunscreen of claim 1 wherein the aqueous phase further comprises sodium stearoyl glutamate.

16. The sunscreen of claim 1 wherein the aqueous phase further comprises xanthan.

17. The sunscreen of claim 1 which further comprises mixed tocopherols.

18. The sunscreen of claim 1 which further comprises diisostearoyl polyglyceryl-3 dimer dilinoleate.

19. The sunscreen of claim 1 which further comprises Caprylic/Capric Triglyceride.

* * * * *